US007432622B2

(12) United States Patent
Griepentrog et al.

(10) Patent No.: US 7,432,622 B2
(45) Date of Patent: Oct. 7, 2008

(54) METHOD FOR THE WIRELESS AND CONTACTLESS TRANSPORT OF ENERGY AND DATA, AND CORRESPONDING DEVICE

(75) Inventors: Gerd Griepentrog, Gutenstetten (DE); Reinhard Maier, Herzogenaurach (DE); Andreas Pohl, Wilkau-Haβlau (DE)

(73) Assignee: Siemens Aktiengesellschaft, Munich (DE)

( * ) Notice: Subject to any disclaimer, the term of this patent is extended or adjusted under 35 U.S.C. 154(b) by 321 days.

(21) Appl. No.: 10/525,825

(22) PCT Filed: Aug. 27, 2003

(86) PCT No.: PCT/DE03/02854

§ 371 (c)(1),
(2), (4) Date: Feb. 25, 2005

(87) PCT Pub. No.: WO2004/021376

PCT Pub. Date: Mar. 11, 2004

(65) Prior Publication Data

US 2005/0225188 A1 Oct. 13, 2005

(30) Foreign Application Priority Data

Aug. 30, 2002 (DE) ................................ 102 40 080

(51) Int. Cl.
*H02K 3/00* (2006.01)
*H02K 11/04* (2006.01)

(52) U.S. Cl. ......................... 310/112; 310/12; 310/179; 322/100; 307/104

(58) Field of Classification Search ................. 310/112, 310/12, 179, 180; 322/100; 307/104; 336/118, 336/120; 363/144; 104/290, 292
See application file for complete search history.

(56) References Cited

U.S. PATENT DOCUMENTS

| | | | | |
|---|---|---|---|---|
| 4,635,560 | A * | 1/1987 | Ballantyne | 104/292 |
| 5,055,775 | A | 10/1991 | Scherz | 324/158 MG |
| 5,521,444 | A | 5/1996 | Foreman | 307/104 |
| 5,542,356 | A * | 8/1996 | Richert et al. | 104/289 |
| 5,770,936 | A * | 6/1998 | Hirai et al. | 318/538 |
| 6,307,766 | B1 * | 10/2001 | Ross et al. | 363/144 |
| 6,326,713 | B1 | 12/2001 | Judson | 310/112 |
| 6,580,185 | B2 * | 6/2003 | Kang et al. | 310/12 |
| 2002/0093252 | A1 | 7/2002 | Kang et al. | 310/12 |
| 2005/0225188 | A1 * | 10/2005 | Griepentrog et al. | 310/112 |

FOREIGN PATENT DOCUMENTS

| | | |
|---|---|---|
| DE | 33 04 719 A1 | 8/1983 |
| DE | 33 03 961 C2 | 12/1989 |
| DE | 42 36 340 A1 | 5/1994 |

(Continued)

OTHER PUBLICATIONS

European Office Action dated Aug. 8, 2007.
Japanese Office Action (English translation) dated Jan. 31, 2008.

*Primary Examiner*—Karl I Tamai
(74) *Attorney, Agent, or Firm*—Harness, Dickey & Pierce, P.L.C.

(57) ABSTRACT

In installations including fixed and mobile structural elements and a rotary current motor as a drive, the rotary current motor can be used for the wireless transmission of both energy and/or data. The transmission from the fixed structural elements to the mobile structural elements of the rotary current motor is especially inductive. In the corresponding device including a rotary current motor including a stator and a secondary element, the secondary element is not embodied as a solid conductor with or without a laminated core, according to prior art, but rather as a laminated core including integrated windings which is the same as, or similar to, the stator.

3 Claims, 8 Drawing Sheets

FOREIGN PATENT DOCUMENTS

| | | | |
|---|---|---|---|
| DE | 196 49 682 | A1 | 6/1998 |
| DE | 197 07 860 | C2 | 9/1998 |
| DE | 198 01 586 | A1 | 7/1999 |
| DE | 199 53 583 | C1 | 12/2001 |
| JP | 01295692 | * | 11/1989 |
| JP | 03-007002 | * | 1/1991 |
| JP | 6006993 | | 1/1994 |
| JP | 11252985 | | 9/1999 |

* cited by examiner

METHOD FOR THE WIRELESS AND CONTACTLESS TRANSPORT OF ENERGY AND DATA, AND CORRESPONDING DEVICE

This application is the national phase under 35 U.S.C. § 371 of PCT International Application No. PCT/DE2003/002854 which has an international filing date of Aug. 27, 2003, which designated the United States of America and which claims priority on German Patent Application number DE 102 40 080.6 filed Aug. 30, 2002, the entire contents of which are hereby incorporated herein by reference.

FIELD OF THE INVENTION

The invention generally relates to a method for wire-free or wireless and non-contacting or contactless power/energy and data transport. Additionally, it generally relates to such a method in systems which include fixed and moving structural parts, preferably including a three-phase motor as a drive for the moving structural parts. The three-phase motor may in this case be in the form of a rotating motor and, in particular, a linear motor as well. The invention also generally relates to an apparatus for carrying out the method, preferably having a three-phase motor which includes a stator and rotor or linear secondary part—both of which are referred to in the following text just as a secondary part.

BACKGROUND OF THE INVENTION

Transport devices are frequently driven directly by linear motors. In this case, it is necessary to transmit power and information to the driven components in order in turn to be able to carry out specific functions there, such as loading and unloading, and to supply devices for this purpose.

Problems relating to such devices, especially with linear motors, will be explained in the following text using an example. A piece goods transport device includes a large number of vehicles which themselves carry various goods, such as packages, postal items etc. The vehicles move on predetermined paths, such as rails or the like, and are driven by one or more linear motors (LIM).

One or more stators of these linear motors (LIM) is or are fitted in a fixed position or positions between the rails. The secondary parts of the linear motors (LIM) are attached to the vehicle to be driven and, by way of example in the case of an asynchronous three-phase LIM in the simplest case, include a solid conductor, for example aluminum or copper, but are often also equipped with a laminated core behind this solid conductor in order to improve the magnetic return path. When the vehicle with the secondary part of the linear motor (LIM) moves over the fixed stator a driving force acts on the vehicle as a result of the LIM principle, which is known per se. Since the vehicles are coupled to one another, even vehicles which are not being driven at any given time and are accordingly located between two stators are driven.

By way of example, in order to sort packages, the vehicles have to pick up and deposit piece goods in order that the transport device can carry out its correct task. For this purpose, the trucks have a conveyor device, for example a conveyor belt with an electrical drive or the like, which can pick up and place down the piece goods at specific points transversely with respect to the movement direction of the vehicle. On the one hand, power is required for this drive located on the vehicle. On the other hand, it is necessary to signal in some suitable manner to the drive when and in what way piece goods should be picked up or placed down. Furthermore, it may be necessary to transmit information from the vehicle about the piece goods, for example the weight, size, shape, code read from the piece goods, etc., to a fixed controller for the transport device.

It is known from the prior art, for moving parts of a transport device to be supplied with electrical power and for the communication with such moving parts to be organized via sliding contacts as well as sliding contact lines fitted to the movement path. Both the sliding contacts and the sliding contact lines are subject to a certain amount of wear.

Accordingly, both the sliding contacts and the sliding contact lines require intensive maintenance. Furthermore, the sliding contact lines and the sliding contacts make up a considerable proportion of the total costs of the transport device.

One example of the need to transmit power and information to rotating components is that for measurements directly on rotating structural parts. This is the situation, for example, for torque determination, in which strain gauges are used to determine the torsion on the shaft resulting from the torque. On the one hand, the rotating measurement device and signal processing require power, while on the other hand the measured value must be transmitted to the fixed part of the system. Further examples occur with the operation of magnetic bearings or the control of rotating field windings.

According to the prior art, power and data are transmitted to rotating structural parts via slip-rings with associated sliding contacts. This is associated with the disadvantages which have already been mentioned further above. In particular for data transmission to rotating components, telemetry devices are known, although these are corresponding costly.

U.S. Pat. No. 6,326,713 B1 discloses an electrical machine and a method for transmission of power between the different systems, in particular the stator and the rotor of the machine, in which power is transmitted inductively. The electrical machine is modified for this purpose, and special coils with suitable inductances are provided. Furthermore, DE 199 32 504 A1 describes the provision of non-contacting power and data transmission between two parts which can rotate with respect to one another, with the transmission path for power and data transmission comprising two or more coils which are mounted such that they can rotate with respect to one another. For power transmission in the medium-frequency range from a primary stationary conductor to moving secondary loads, DE 42 36 340 A1 provides for the secondary conductors to have coils which are rotated about the primary energy producer with a coil. The same principle of inductive power transmission from one coil to another coil is disclosed in WO 01/88931 A1.

Furthermore, U.S. Pat. No. 5,521,444 A discloses a device for transmission of electrical power from a stationary device element to a rotating device element, without any direct contact.

SUMMARY OF THE INVENTION

An object of an embodiment of the invention is to specify an improved method which can be used equally well for power and data transport, and to provide an associated apparatus.

An embodiment of the invention provides an improved capability to transmit power on the one hand and data as information on the other hand from fixed components of a system to moving components of the system, and to functional control devices there. This may be advantageous, in particular, for transport devices with a linear motor. However, it can also be used for systems with rotating parts. Functions can thus be carried out with accurate data on the driven parts of the system.

An embodiment of the invention may avoid at least one of the disadvantages of the prior art as mentioned above, since the three-phase motor, which may be provided in any case in order to drive the moving components, may be at the same time used to transit power and data. An idea of an embodiment of the invention is not only to design the secondary part as a solid conductor with or without a laminated core, but in fact to use a laminated core which is the same as or similar to the stator and has windings inserted in it as the secondary part, as will be explained further below with reference to FIG. 1 and FIG. 2. A feature for the production of a translational force in an embodiment, is that the stator and secondary part have the same number of pole pairs and pole pitches. However, the stator and secondary part may have windings with different numbers of turns and a different cross section.

BRIEF DESCRIPTION OF THE DRAWINGS

Further details and advantages of the invention will be found in the following description of the figures and description of exemplary embodiments, with reference to the drawings, in which, in each case illustrated schematically.

Identical elements have the same reference symbols in the individual figures. In some cases, the figures will be described jointly in the following text.

DETAILED DESCRIPTION OF THE EXEMPLARY EMBODIMENTS

Figure 1:
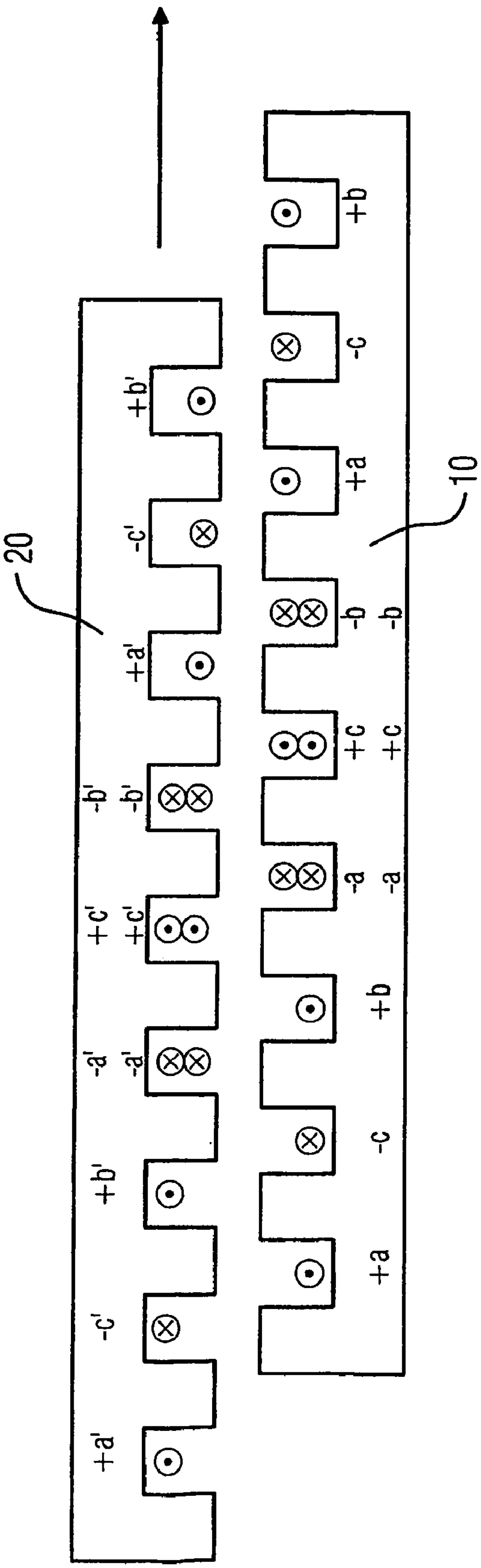
FIG. 1 shows the basic design of the stator and secondary part of a linear motor.

FIG. 1 shows the major parts of a linear motor. A fixed stator is annotated 10, while, in contrast, the secondary part of the linear motor, which moves relative to it, is identified by 20. The stator 10 and the secondary part 20 have winding sections a, b and c which are connected in different combinations ±a, ±b and ±c, where + and − denote the respective current flow direction, to the phases L1, L2, L3 which are used as the supply lines for the windings.

Figure 2:
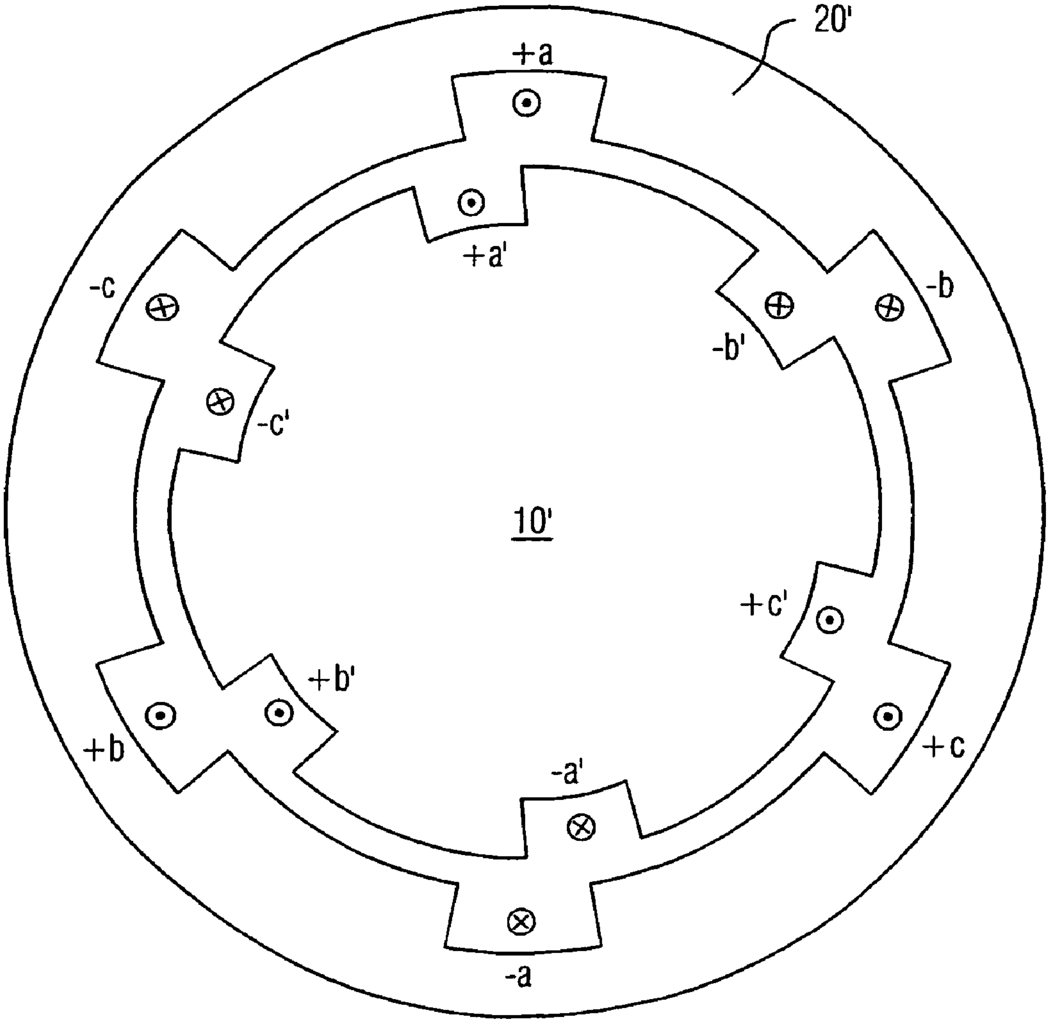
FIG. 2 shows the basic design of the stator and rotor of a rotating three-phase motor.

FIG. 2 shows the corresponding parts of a rotating three-phase motor. A fixed stator is in this case annotated 10' while, in contrast, the secondary part which moves relative to it as the rotor is identified by 20'. The stator 10' and rotor 20' once again have winding sections a, b and c, which are connected in different combinations ±a, ±b and ±c, where + and − denote the respective current flow direction, to the phases L1, L2, L3, which are used as supply lines for the windings.

In FIGS. 3 to 8, the windings for the stator 10 are annotated 11 to 13, and those for the secondary part 20 are annotated 21 to 23. A motor controller 30 is connected between the power supply system feed with the phases L1, L2, L3 and the windings 11 to 13.

Figure 4:
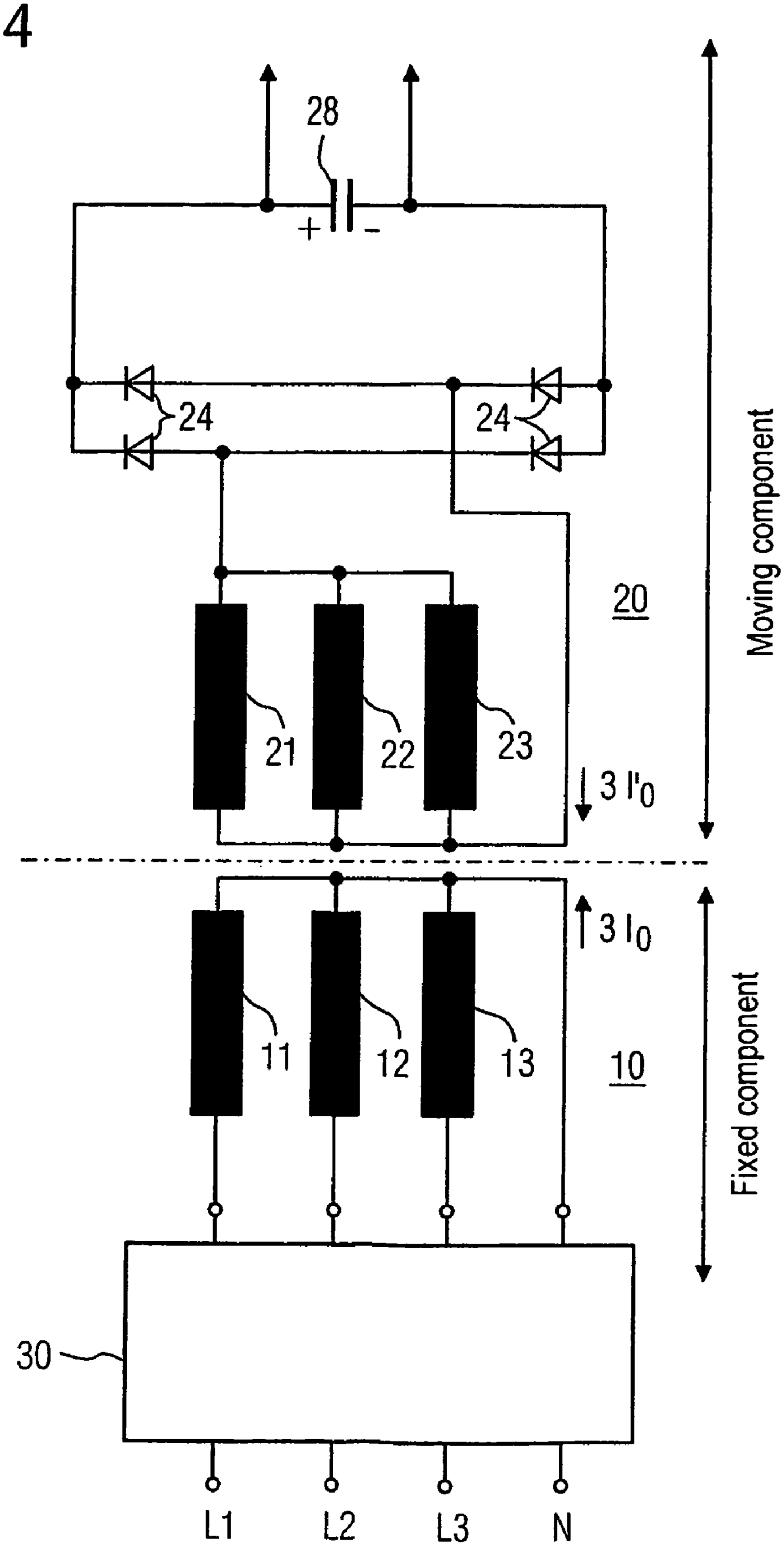
FIG. 4 shows circuitry, modified from that shown in FIG. 3, for the stator and secondary part of the three-phase motor shown in FIG. 1.

FIG. 4 shows a corresponding situation, but with a harmonic being used to supply the secondary part in this case. When used correctly for a transport apparatus with moving vehicles 50, 50' . . . 50$^{n'}$, the stator 10 is part of a track or rail system, which is not illustrated in the drawing, and the secondary part 20 is part of a single vehicle 50. The individual vehicles 50, 50', . . . 50$^{n'}$ are in this case physically identical.

Figure 3:
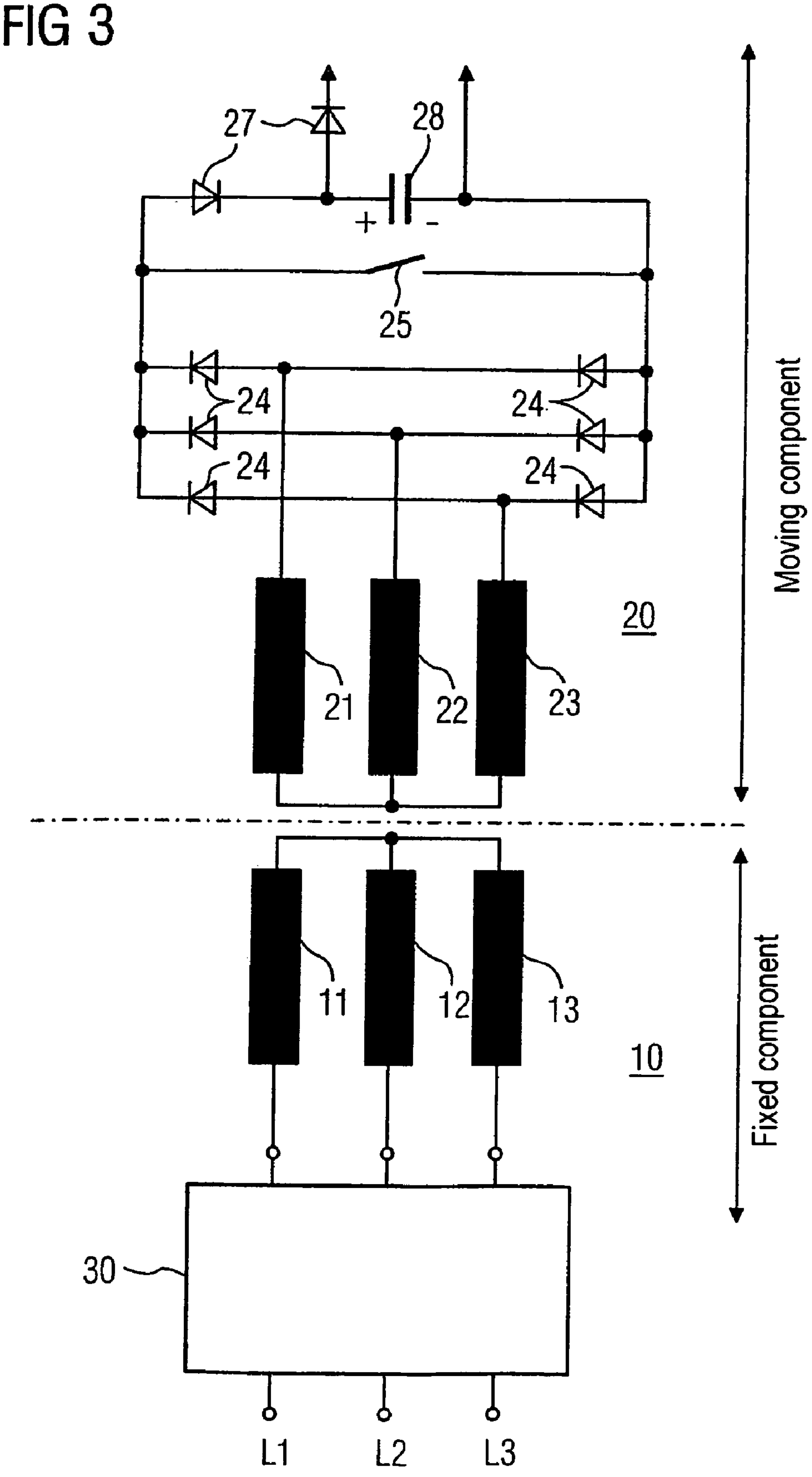
FIG. 3 shows the circuitry for the stator and secondary part of the three-phase motor shown in FIG. 1.

Power is transmitted from the stator 10 or 10' to the respective moving secondary part 20 or rotor 20' as illustrated in the form of a circuit diagram in FIG. 3 in which, in particular, the parts 10 and 20 are identified, and this is done on the following principle:

The three windings 11 to 13 of the stator 10 are connected in the normal manner to the three-phase power supply system or to a three-phase motor controller 30, for example a frequency converter or a three-phase controller. The three windings 21 to 23 of the secondary part 20 are connected in star or delta. The free ends of the windings 21 to 23 are connected by means of diodes D1 to D6 to a six-pulse rectifier 24 when they are connected in star, and their nodes are connected by means of diodes D1 to D6 to a six-pulse rectifier 24 when they are connected in delta. In certain conditions, AC voltages are induced in the windings 21 to 23 of the secondary part 20 as a result of the induction caused by the stator 10. These voltages are converted in the rectifier 24 to a DC voltage, which produces a pulsating direct current when a load is applied to the rectifier output.

The direct current is first of all supplied to an energy storage element, such as a supercap, a rechargeable battery or the like, but in particular a capacitor 28 with a capacitance C, via a further diode 26. Initially, the capacitor 28 represents a short circuit, since its voltage is $U_c=0$. In this case, the situation is accordingly similar to that of a squirrel-cage rotor for an asynchronous motor. As the current flows, the voltage across the capacitor 28 rises in proportion to the amount of charge. When a specific voltage, as is required for supplying power to the vehicle 50, is reached, then the switch 25 is closed, thus resulting in a short-circuited rotor for the linear motor, once again. This prevents further charging of the capacitor C, and the voltage across the capacitor remains constant or falls when loads in the vehicle 50 are fed from the charge in the capacitor 28. When the switch 25 is closed, the diode 26 prevents the capacitor 28 from being discharged via the switch 25.

Figure 5:
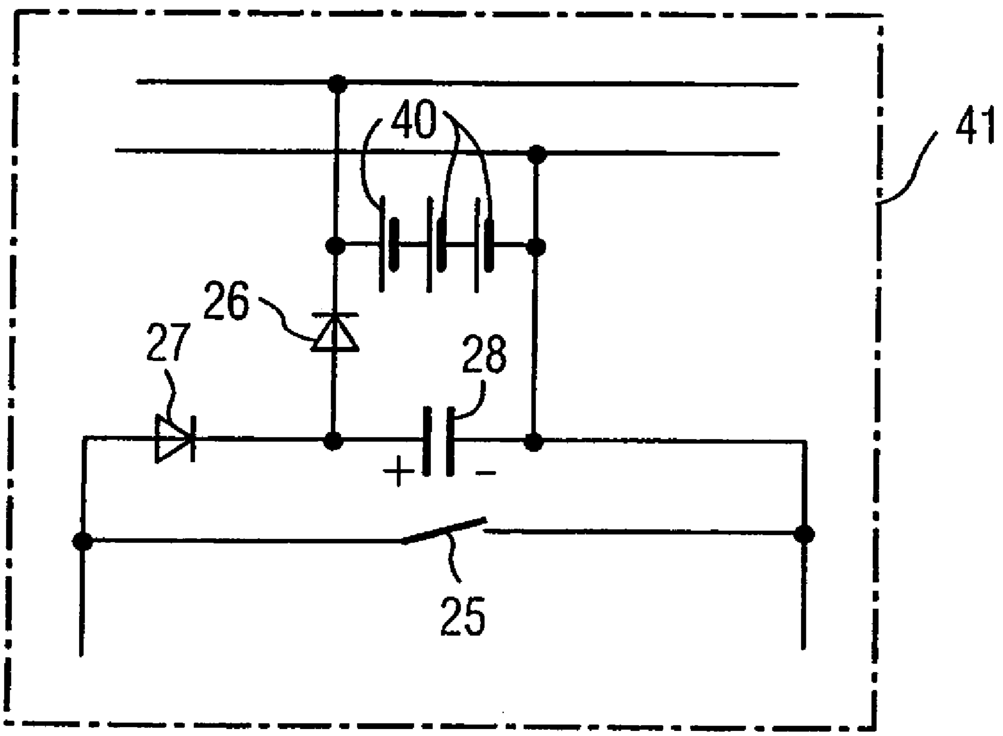
FIG. 5 shows power being supplied to a single vehicle in a transport system.

When the voltage across the capacitor 28 now falls below a specific threshold value as a result of being discharged through the loads on the vehicle 50, as shown in FIG. 5, the switch 25 is opened again, and the capacitor 28 with the capacitance C is charged again. As the procedure continues, the voltage across the capacitor 28 is thus regulated between an upper and a lower limit value by operation of the switch 25.

In one particularly advantageous embodiment, the switch 25 is a transistor, in particular a field-effect transistor. A transistor such as this allows very high switching frequencies to be achieved, thus resulting in a quasi-steady-state voltage across the capacitor 28, which can be used for supplying power to the vehicle 50.

Suitable control algorithms are used to activate the switch 25 in such a way that the voltage across the capacitor 28 is kept virtually constant independently of the power drawn and of the speed of the secondary part 20.

In a first embodiment of this procedure, only the voltages induced by the translational slip in the secondary part are used for charging the capacitor 28. To do this, the speed of the secondary part has a certain amount of slip with respect to the traveling field of the stator. This slip is additionally provided to the slip component which transmits the power from the stator 10 to the secondary part 20.

In one variant of the procedure explained above, the voltage across the capacitor 28 is kept in the region of a few volts in order to minimize the additional slip which occurs in principle as a result of the power transmission, with this voltage subsequently being raised to the required level in a DC/DC converter.

In a further option for power transmission, as is illustrated in FIG. 3, a current which is identical in each of the three windings 11 to 13, that is to say in each case has the same phase angle, is superimposed on the three windings 11 to 13 of the stator 10 in addition to the three currents which are at the power supply system frequency and have phase angles of 120° between them. This current is also referred to as the neutral current, because the stator star point must be connected for its return path. The neutral current that is applied is preferably at a higher frequency than the power supply system frequency.

If this neutral current has the same phase angle in all three windings, then this results only in a field which varies with time, but in a traveling field. No additional shear forces are thus produced either, by the higher-frequency currents.

In the latter variant, both the windings 11 to 13 of the stator 10 and the windings 21 to 23 on the secondary part 20 must be connected in star, with an accessible star point, in order to provide the return path for the neutral current. The magnetic field from the stator windings 11 to 13 once again induces a voltage in the three short-circuited secondary winding elements 21 to 23, which voltage can be used in the manner already described via a two-pulse rectifier for charging of the capacitor 28 with the capacitance C, and thus for supplying power to the vehicle 50. This method has the advantage that the amount of power which can be transmitted is largely independent of the slip between the secondary part 20 and the traveling field of the stator 10.

If, by way of example, a neutral current is fed in in the manner described above, then the circuitry of the stator 10 and secondary part 20 must be modified as shown in FIG. 3.

In this case, there is no need for charge regulation, because the voltage across the capacitor 28 cannot exceed the transformed value of the applied harmonic. The forward movement of the transport device that is produced as well as the power supply for the transported device can thus be controlled independently of one another.

In transport devices, the stator 10 is generally supplied via converters, for example the motor controller 30. The above-mentioned frequency component can be produced without any additional hardware complexity by suitable modification of the control method, for example suitable modulation of the voltage space vector, for the converter.

Both the power transmission principles described above operate not only when the secondary part 20 is in the area of the induction field of the stator 10. However, this is true only when the vehicle 50 in FIG. 5 is stopped with the secondary part 20 precisely above a stator 10, or is moving over it. In order to ensure the power supply to the vehicle 50 even when the vehicle 50 is not located above a stator 10 at that time, a rechargeable energy store 40 which, for example, may once again be a supercap or a rechargeable battery, is additionally fitted to each vehicle 50 in order to stabilize the supply voltage. The energy store 40 is charged when the vehicle is located above the stator, and is then used as the energy source for supply power to the vehicle when the vehicle is between two stators. In this case, it is necessary to ensure that the ratio of the power to be supplied while located above the stator 10 to the average power required between two stators 10, 10' during motion is higher than the ratio of the movement time to the stationary time. The transport device must therefore move continuously.

Figure 6:
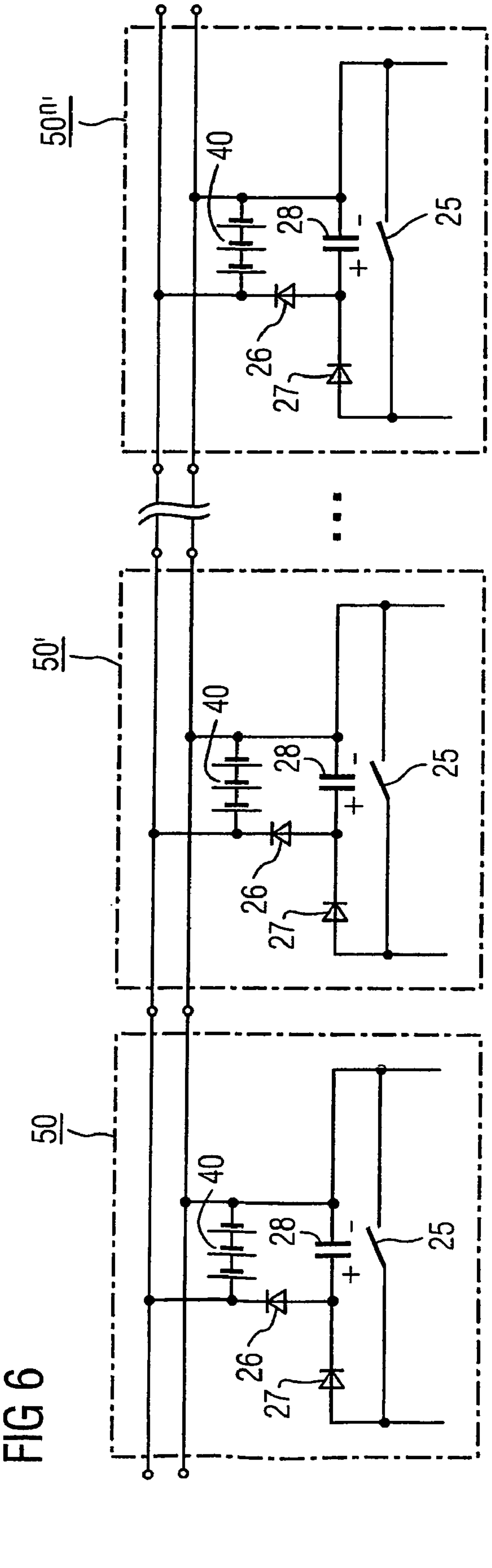
FIG. 6 shows a power bus for supplying all the vehicles.

In a further embodiment as shown in FIG. 6, the power supplies for the vehicles 50, 50', . . . 50$^{n'}$ can be connected to one another. This is possible because the vehicles 50, 50', . . . 50$^{n'}$ in any case form an essentially closed chain because, if this were not the case, the vehicles which are not being driven at that time would remain stationary. The connection of the power supplies to the vehicles results in a power bus, so that vehicles which are currently located above a stator also provide the power for vehicles which are currently between two stators 10, 10'. This allows the energy stores 40 on each vehicle 50, 50', . . . 50$^{n'}$ to be considerably smaller, or else to be omitted completely. A further advantage is that all the vehicles 50, 50', . . . 50$^{n'}$ can be supplied with power for an indeterminate time even when the transport device is stationary.

Figure 7:
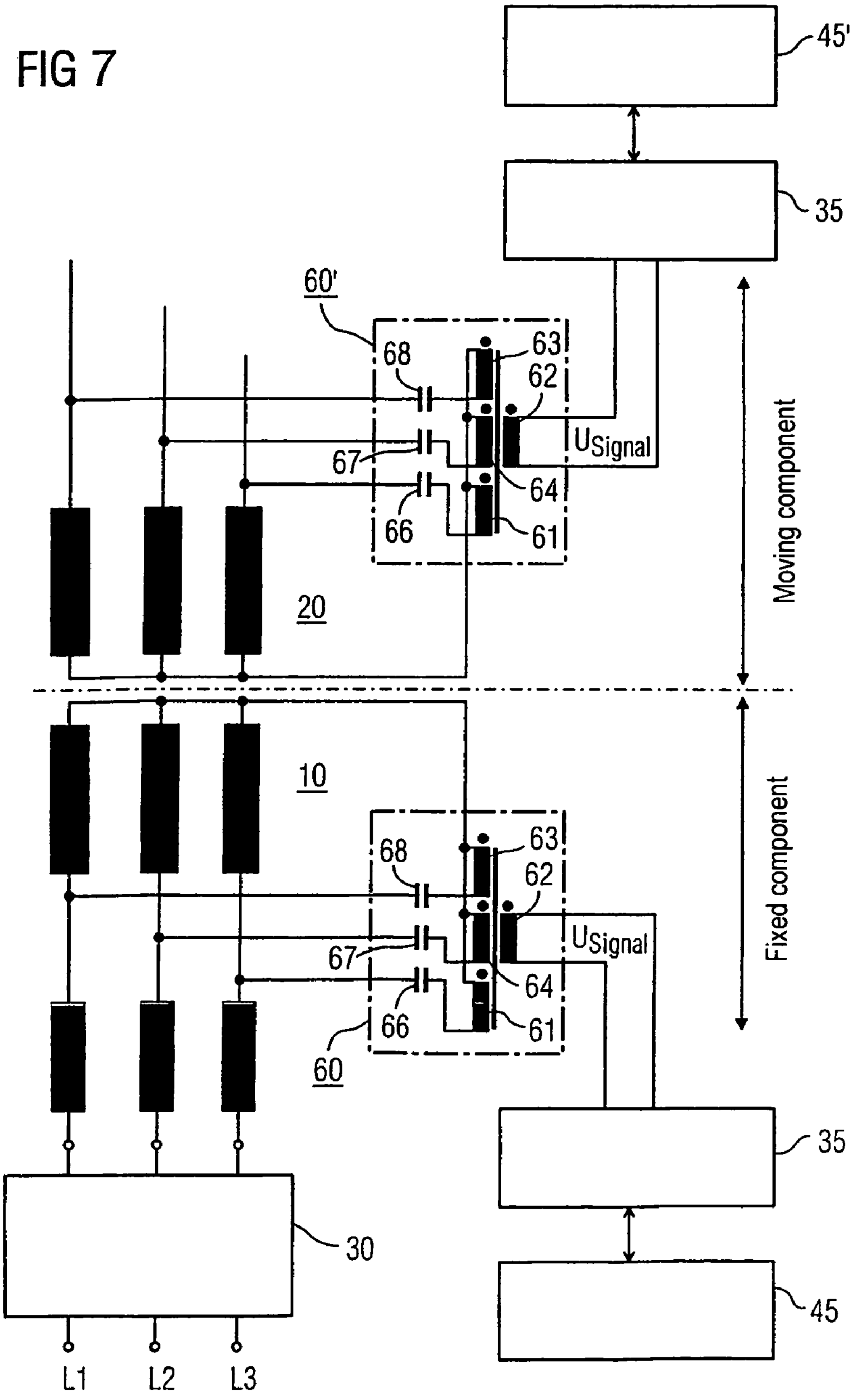
FIG. 7 shows the inputting and outputting of high-frequency signals in order to transmit data between the stator and secondary part of the three-phase motor.

FIG. 7 shows data being transmitted from the fixed part to the moving part of the linear motor, that is to say from the stator 10 to the moving vehicles 50, 50', . . . 50$^{n'}$, and vice versa, on the basis of the following principle: The inductive coupling between the stator 10 as the primary part and the secondary part 20 is likewise made use of. The data is modulated in some suitable form, which is known in a corresponding manner from the prior art, and is transmitted in the form of signals at a considerably higher frequency than the power supply system frequency. Any desired methods such as PSK, FSK, OFDM, CDMA or frequency hopping, etc., may be used as the modulation method.

On the stator side, the operating voltage, which is at the power supply system frequency, has the high-frequency signal for transportation of the data superimposed on it. A so-called coupling unit 60 is used for this purpose, which essentially comprises a high-frequency transformer with four windings 61 to 64 as well as three coupling capacitors 66 to 68. When the three windings on the power supply system side of the high-frequency transformer 61 to 63 are being connected, care must be taken to ensure that the coil connections are oriented in the same way with respect to the winding starts, in order that the high-frequency magnetic fields do not cancel one another out in the air gap in the linear motor.

As is shown in detail in a particularly advantageous manner in FIG. 6, the star point of the three stator windings 11 to 13 is advantageously in each case connected to the other winding end. If the stator 10 is connected in delta, each winding 11, 12, 13 on the stator 10 is connected to a respective winding 61, 62, 63 on the high-frequency transformer such that the fields reinforce one another.

However, all other inputting methods which are known according to the prior art may in principle also be used. A corresponding procedure is used on the secondary part side, by the essentially identical coupling unit 60 being connected in the same manner to the winding ends of the secondary part 20. The fixed component also has a coding device 35 with a modulator/demodulator and a controller 45, while the moving component has a coding device 35' with a modulator/demodulator and a controller 4'.

Figure 8:
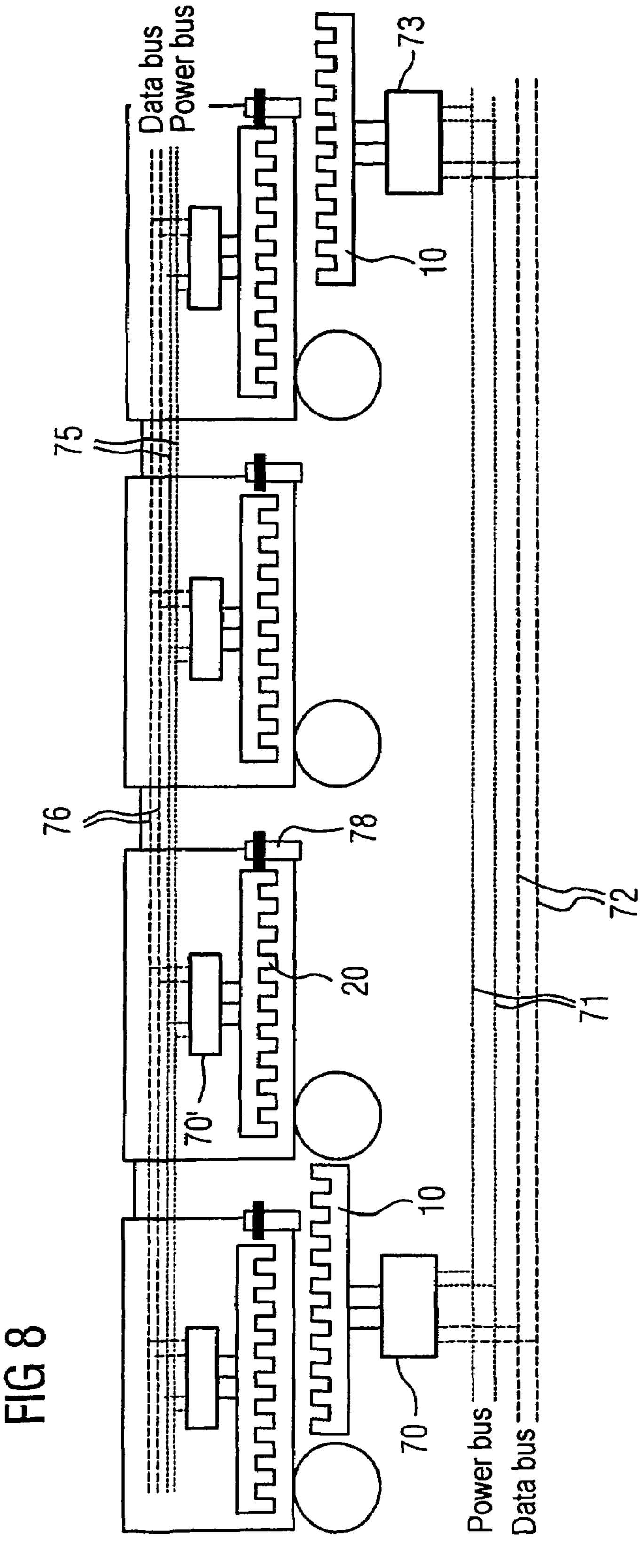
FIG. 8 shows the complete data and power bus system.

FIG. 8 shows a combined data and power bus system for the stationary area with stators 10 on the one hand, and the moving area with secondary parts 20 and vehicles 50 on the other hand. In this case, a sensor 78 is also fitted to each secondary part 20 and detects when a single vehicle 50 is located above the stator 10. When a vehicle 50 is detected above the stator 10, then the controller for the moving components allows the associated coding device to transmit message telegrams. The vehicle 50 itself identifies incoming data telegrams and, after successful reception of a telegram from the stator 10, can itself transmit a data telegram via the stator 10 to the fixed controller with electronics 70.

In order additionally to transmit data to vehicles 50 which are not located above a stator 10, all of the vehicles 50, 50', . . . , 50$^{n'}$ as shown in FIG. 8 can be connected to one another by way of a data line or a data bus 76. Furthermore, each telegram is preceded by a unique destination address, so that the message recipient can be identified. When a vehicle 50 now receives a data telegram which is not intended for it, it transmits this data telegram to the data bus 76. The telegram traffic on the data bus 76 can from then on continue on the basis of the CSMA/CA, CSMA/CD or master/slave principles, which are known from fieldbus systems. A power bus 71 on the one hand and a data bus 72 on the other hand can likewise be provided on the stator side.

In the arrangements which have been described with reference to the individual figures, the major technical advantages are that there is no longer any need for sliding contacts and sliding contact lines for transmission of power and data. This results in a system which is very largely maintenance-free.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for wireless and non-contacting power and information transport in systems which include fixed and moving structural parts, comprising:

supplying a three-phase motor including a stator with three-phase windings and a secondary part with three-phrase windings as a drive for the moving structural parts, wherein the three-phase windings of the stator and the three-phase windings of the secondary part are connected in a star-shaped configuration with an accessible star point, and wherein the secondary part includes a four-pulse rectifier;

using a fundamental current for driving the three-phase motor;

using a neutral current for the transmission of at least one of power and information via the inductive coupling between the stator and the secondary part, wherein the neutral current is three times the power supply frequency and has the same phase angle in all windings so as to induce a non-traveling time-variable field, and wherein the star point is connected so as to allow the return flow of the neutral current; and supplying devices, arranged on the moving structural parts of the system, with at least one of power and information.

2. The method as claimed in claim 1, wherein the information transmitted via inductive coupling between the stator part and the secondary part is data being modulated and being transmitted in the form of signals.

3. An apparatus for carrying out the method of claim 1, comprising:

the three-phase motor, including a stator and a secondary part, wherein the stator and the secondary part respectively have three-phase windings with the same number of pole pairs and with the same pole pitch.

* * * * *